J. C. CHRISTENSEN.
IMPLEMENT SUPPORT.
APPLICATION FILED AUG. 24, 1918.
1,388,799.
Patented Aug. 23, 1921.
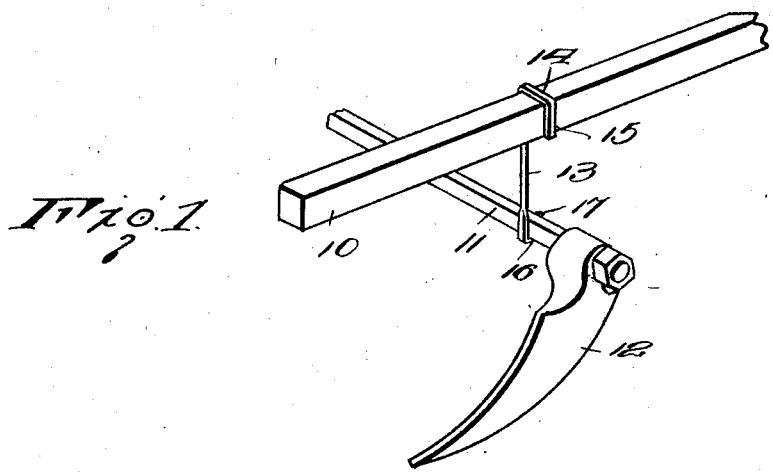
Fig. 1.
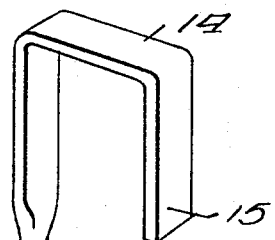
Fig. 2.
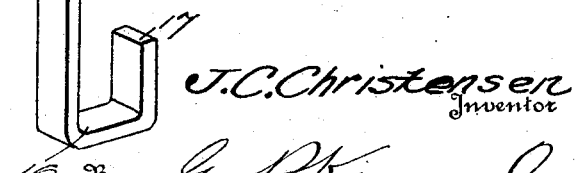
J. C. Christensen
Inventor
By Geo. P. Kimmel
Attorney

UNITED STATES PATENT OFFICE.

JENS C. CHRISTENSEN, OF PENN YAN, NEW YORK.

IMPLEMENT-SUPPORT.

1,388,799.　　　　Specification of Letters Patent.　　Patented Aug. 23, 1921.

Application filed August 24, 1918. Serial No. 251,286.

*To all whom it may concern:*

Be it known that I, JENS C. CHRISTENSEN, a citizen of Denmark, and resident of Penn Yan, in the county of Yates and State of New York, have invented certain new and useful Improvements in Implement-Supports, of which the following is a specification.

This invention relates to grain drills, and more particularly to an attachment therefor designed to hold up the spare tooth bars when drilling either corn or beans, so as to hold the same out of the way when not in use and obviating the old fashion of tying the same up with wire, as well as saving time and labor and permitting the tooth bar to be held up with facility.

With the above and other objects in view, as will appear as the description proceeds, the invention comprises the various novel features of construction and arrangement of parts which will be more fully described herein and set forth with particularity in the claim appended hereto.

Reference is had to the accompanying drawings forming a part of this application, in which like reference characters indicate the corresponding parts throughout the several views, in which—

Figure 1 is a perspective view showing the device applied to a grain drill to hold up one of the tooth bars thereof, and Fig. 2 is an enlarged perspective view of the device.

Referring to the drawing, 10 represents a part of the rear transverse bar or frame member adjacent to the seed box, a part of which is represented at 10′ and attached in the usual manner to the side frame members, a part of one of which is represented at 10².

A portion of one of the tooth bars is represented at 11 and carrying a conventional tooth 12.

The tooth bars of the conventional seeding machine of the drill pattern are spaced at relatively short intervals to adapt the machine for planting or "drilling" wheat, oats, barley, and the like, but when planting corn, beans and the like, which are planted at greater distances between the rows, it is customary to elevate certain of the tooth bars at uniformly spaced intervals and fasten them in elevated and inoperative position by wires, cords or the like, but this is an unsatisfactory method, and consumes time both in fastening and unfastening the bars. To overcome this difficulty I provide a double ended hook consisting of a shank portion 13 having the upper end thereof flattened and bent horizontally as shown at 14 and then downwardly as shown at 15 to provide a hook. As indicated, the shank is of round stock and has the upper end portion flattened to form the hook, while the lower portion is flattened and twisted at right angles to the upper portion and then bent horizontally as shown at 16 and vertically as shown at 17, to provide a hook extending in an opposite direction to the hook at the upper end of the shank and disposed in a vertical plane at right angles to the upper hook. The bight portion of each hook is therefore disposed parallel to the bight portion of the other hook.

It will thus be seen that the device can be applied to the bar 10 through the medium of the upper hook of the shank portion of the attachment, engaged from the front to the rear edge of the same, while the lower hook will engage around the tooth bar 11 in a plane at right angles.

It will be understood that one of the improved devices will be employed for each "spare" tooth bar which is to be held in inoperative position, but one only is shown for illustration.

The devices being loosely applied to the bar 10, may be adjusted longitudinally thereof and thereby engaged with any of the bars and at any required distance apart to provide for sowing seeds at correspondingly varied distances between the rows.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having thus described my invention, what I claim as new and desire to secure by Letters Patent, is:

As a new article of manufacture, a double ended hook member formed of a length of stock of circular cross section throughout its intermediate length and of rectangular cross section at its opposite end portions, the rectangular end portions of the strap being bent to form upper and lower hooks, each substantially rectangular in side elevation, the lower of said hooks being disposed at right angles to the upper of said hooks and substantially less in size than the latter, the opening of the bills of said hooks being directly opposed one to the other.

In testimony whereof I affix my signature hereto.

JENS C. CHRISTENSEN.